United States Patent [19]
Covino et al.

[11] Patent Number: 5,721,863
[45] Date of Patent: Feb. 24, 1998

[54] METHOD AND STRUCTURE FOR ACCESSING SEMI-ASSOCIATIVE CACHE MEMORY USING MULTIPLE MEMORIES TO STORE DIFFERENT COMPONENTS OF THE ADDRESS

[75] Inventors: James J. Covino; Roy Childs Flaker, both of Essex Junction; Alan Lee Roberts, Jericho; Jose Roriz Sousa, Colchester, all of Vt.

[73] Assignee: International Business Machines Corporation, Armonk, N.Y.

[21] Appl. No.: 593,639

[22] Filed: Jan. 29, 1996

[51] Int. Cl.6 .................................................. G06F 12/08
[52] U.S. Cl. ...................... 395/455; 395/403; 395/412; 395/468
[58] Field of Search .............................. 395/403, 412, 395/460, 468, 455, 457

[56] References Cited

U.S. PATENT DOCUMENTS

| | | | |
|---|---|---|---|
| 4,969,122 | 11/1990 | Jensen | 365/49 |
| 5,051,997 | 9/1991 | Sakashita et al. | 371/22.4 |
| 5,077,826 | 12/1991 | Grohoski et al. | 395/417 |
| 5,099,481 | 3/1992 | Miller | 371/22.1 |
| 5,107,501 | 4/1992 | Zorian | 371/21.3 |
| 5,138,619 | 8/1992 | Fasang et al. | 371/21.1 |
| 5,173,906 | 12/1992 | Dreibelbis et al. | 371/22.5 |
| 5,224,101 | 6/1993 | Popyack, Jr. | 371/21.1 |
| 5,258,986 | 11/1993 | Zerbe | 371/21.2 |
| 5,301,156 | 4/1994 | Talley | 365/201 |
| 5,311,520 | 5/1994 | Raghavachari | 371/21.6 |
| 5,329,471 | 7/1994 | Swoboda et al. | 364/578 |
| 5,349,587 | 9/1994 | Nadeau-Dostie et al. | 371/22.3 |
| 5,351,213 | 9/1994 | Nakashima | 365/201 |
| 5,377,148 | 12/1994 | Rajsuman | 365/201 |
| 5,388,104 | 2/1995 | Shirotori et al. | 371/21.1 |
| 5,574,875 | 11/1996 | Stansfield et al. | 395/403 |

OTHER PUBLICATIONS

"Testing Embedded Single and Multi–Port RAMs Using BIST and Boundary Scan," Alves, et al. IMAG/TIMA Laboratory publication, 1992 IEEE.

*Primary Examiner*—Tod R. Swann
*Assistant Examiner*—J. Peikari
*Attorney, Agent, or Firm*—Calfee, Halter & Griswold LLP

[57] ABSTRACT

A structure and method of operation of a cache memory are provided. The cache memory is organized such that the data on a given line of any page of the main memory is stored on the same line of a page of the cache memory. Two address memories are provided, one containing the first eight bits of the virtual address of the page of the data in main memory and the second the entire real page address in main memory. When an address is asserted on the bus, the line component of the address causes each of those lines from the cache memory to read out to a multiplexor. At the same time, the eight bit component of the virtual address is compared in the first memory to the eight bits of each line stored in the first memory, and if a compare is made, the data on that line from that page of cache memory is read to the CPU. Also, the entire real address is compared in the second memory, and if a match does not occur, the data from the cache to the CPU is flagged as invalid data. A structure and method are also provided to determine if duplicate addresses exist in the second address memory.

16 Claims, 5 Drawing Sheets

METHOD AND STRUCTURE FOR ACCESSING SEMI-ASSOCIATIVE CACHE MEMORY USING MULTIPLE MEMORIES TO STORE DIFFERENT COMPONENTS OF THE ADDRESS

RELATED APPLICATIONS

U.S. patent application Ser. No. 08/398,465, filed Mar. 3, 1995, and entitled "Using One Memory to Supply Addresses to an Associated Memory During Testing"; and U.S. patent application Ser. No. 08/398,468, filed Mar. 3, 1995, entitled "BIST Tester for Multiple Memories".

FIELD OF THE INVENTION

This invention relates generally to techniques accessing cache memories, and more particularly to the structure and method of accessing cache memories to provide an improved response time for identifying and delivering data contained in a cache memory.

BACKGROUND INFORMATION

Cache memories are used in many computer architecture systems in which a very large amount of data is stored in main memory while a much more limited amount of memory, which is statistically more frequently used and thus desirably should be more readily accessible, is stored in a smaller cache memory. The architecture and configuration of the cache memory, vis-a-vis the main memory, can take many forms, but in one very commonly used and well-known system the main memory is arranged in a series of pages, with each page having a given number of lines of data. For example, a main memory may contain $2^{25}$ pages of data, each page containing $2^7$ lines of data. When the CPU needs to access this data for a particular purpose, the particular address space is denoted by the page number, which requires 25 bits of address information and line number which requires 7 bits of address information. Thus, in this type of memory, a 32-bit (25+7) address bus is utilized.

Before accessing the main memory, which is a relatively slower process than accessing the cache memory, the CPU first determines if the particular line of data is contained in the cache memory. Thus, the addressing technique must address the cache memory to determine if, in fact, the data of the particular line being called for is available in cache; if so, the CPU reads the data from the cache memory and utilizes that information.

For example, one typical way of arranging the cache is to use 8 pages of cache, each with the same number of lines as each page in the main memory. For example, if there are 128 lines on each page in the main memory, there will be 128 lines on each of the 8 pages in the cache memory ($128=2^7$). Moreover, when storing information in the cache memory, the line number of the particular page on which the data is stored in main memory is maintained for storage in cache; i.e., if the data is stored on line 28 of page 50 in the main memory, the data will be stored on line 28 in one of the 8 pages in the cache memory. The purpose of this is to use the access time for identifying whether particular data is stored in cache or not, as will become apparent in a more detailed description of the present invention.

When the CPU requires data which it "knows" to be stored at a particular line on a particular page of main memory, the CPU requests such information and cache memory is first looked at to see if that information is stored in cache. If the information is stored in cache memory, it is delivered to the CPU. If not, the data must be fetched from the main memory. In this structure, it is desirable to determine as quickly as possible if the particular data is stored in the cache and deliver the information to the CPU quickly without undue delay, thereby maximizing the usefulness of the cache memory.

There are several prior art schemes for addressing the cache memory to determine if the data is stored therein. These schemes entail the storing of addresses of the data contained in the cache memory. The stored addresses are the page addresses of that line of data stored in the main memory since this is the location being addressed by the CPU. As indicated earlier, the address contains two components, one component of 25 bits uniquely identifies on which one of $2^{25}$ pages the data is stored, and the other component of 7 bits identifies on which line of the $2^7$ lines on that particular page the data is stored. Thus, an address of 32 bits (i.e., 25 bits plus 7 bits) uniquely identifies the page and line for any line of data stored in main memory.

Also as indicated earlier, when any line of main memory is stored in the cache memory, it is stored on the same line number on one of the eight pages in cache memory on which it is stored in main memory. Thus, in one prior scheme of addressing the cache memory to determine if, in fact, the data is stored in cache, a "TAG memory" is provided which is arranged in exactly the same structure as the cache memory, i.e., 8 pages of 128 lines each is provided wherein on each line of each page of the TAG memory, the 25-bit component (i.e., the page number) of the memory stored in cache is stored. For example, if line 50 of page 200 of data in main memory is stored in the cache memory on page 1, it will be stored at line 50 of page 1, thus the 7-bit line number need not be stored, but only the 25-bit page number. According to this prior art scheme, when a computer is requesting data from a specific page and line in main memory, a 32-bit address component is broken into two segments, one segment of 7 bits and one segment of 25 bits. The segment of 7 bits identifies the line, and this segment is supplied to the TAG memory. In the typical system the 25 bit segment represents a virtual page number which is translated by a Translation Lookaside Buffer (TLB) into the aforementioned 25 bit physical address. This physical address identifies the page number of the data in main memory. The translated address is supplied to a comparator where it is compared with the 25 bit addresses read from the TAG memory array. In parallel with this operation the line of data defined by the 7 bit segment is read from each page of the cache memory. If a comparison is found between the translated 25-bit address component asserted by the CPU and a 25-bit address stored in the TAG memory, indicating that the data by line and page is contained in the cache memory, a late select signal is sent to a multiplexor, and the data from the given line on the correct page from the cache memory is delivered to the CPU. While this type of accessing system does in fact provide an advantage over having to access the main memory, it is still relatively slow and time-consuming, requiring a final match to be made of the 25-bit address stored in a TAG memory before the data is read from the cache memory.

In an improvement to this type of architecture, a Content Addressable Memory (CAM) is provided which stores, but does not read out a certain portion of the 25 bit address generated by the CPU. When the cache is accessed, this portion of the address (8 bits for example) is compared with all 8 bit portions stored in CAM to see if that portion is stored in the CAM, indicating a probability that the data requested by the CPU is in the cache. If a match is found the 25 bit tag and the line of data identified by this match is read from the TAG memory and cache memory. Although this architecture improves performance of the cache compared to that previously described by eliminating the multiplexor from the access path, it adds the delay of the CAM access and match operations in series with the access of the cache memory.

SUMMARY OF THE INVENTION

According to the present invention, an improved architecture, circuitry and method of operation of a semi-associative cache memory addressing system is provided. In this system, the conventional technique of structuring a cache memory to store data on a line of one of the pages of the cache memory, which line corresponds to the line on which the data is stored in the main memory is followed. Thus, data stored on a specific line on a given page of the main memory is stored on the same line on one of the pages of the cache memory. The cache memory is organized into a number of pages, each page having the same number of lines as the lines of the pages of data in the main memory. Also as has been done in the prior art, a portion of the virtual page address bits are stored in a CAM. Each entry in the CAM identifies a line of data in the cache memory as well as the page address (stored in the TAG memory) of that data in main memory. Both the CAM and the TAG are also architected to have the same page and line configuration as the cache memory.

The CPU impresses an address on the bus, and for illustration purposes it will be described as a 32bit address. The 32-bit address has a 7-bit component, indicating the line, i.e., one of 128 lines, the remaining 25 bits being the virtual page address. A portion (8 bits for example) of the virtual page address is stored in each entry of the CAM. The 25 bit component of the address (the virtual page address) is translated to the real page address corresponding to the page in main memory by the previously mentioned TLB. The real page address is subsequently compared to page addresses read from the TAG memory to determine if the data read from the cache memory is valid.

When the 32-bit address is impressed on the bus from the CPU, the 7-bit component indicating the line number is impressed on the CAM memory, the TAG memory and also the cache memory. When the address is impressed on these memories, several things happen. The cache starts to read out the data contained on this line number on each of 8 pages of the cache. Also, the 8-bit portion of the page address is impressed on the CAM on the respective line on each of the 8 pages as delivered by the 7-bit portion of the address to determine if there is a comparison of this 8-bit portion of the page address on the specific line on any one of the 8 pages. If there is a comparison, there is an output to a multiplexor which receives the data on the specific lines of the eight pages from the cache memory. The compare signal actuates the specific line from the specific page in cache on which the match is found, and the data is thereby outputted based on this line select. It should be understood, however, that the output of this data from the cache is based on a comparison only of the first 8 bits of the address and not on the total 25 bits. Therefore, the access of the CAM is done in parallel with the access of the cache memory rather than in series as was described in the prior art. At the same time the CAM comparisons are being done the page addresses stored in the TAG memory are being read out with the 7 bits defining one line out of 128 on each page of cache and main memory. The CAM has made the determination of which of the 8 pages that line would be on, and the 25 bits from the line selected for all 8 pages in the TAG memory are supplied to a multiplexor. A late select signal from the CAM indicating the page on which the match occurred is delivered to the multiplexor, which selects the proper page and delivers the 25 bits defining that page to a comparator, where they are compared to the 25 page number bits from the TLB. If there is a comparison the comparator outputs a positive signal indicating that there was a match and that the data being read from the cache is good data. On the other hand, if there is not a comparison a "no compare" signal is generated by the comparator and the data which has been delivered from the cache memory based on the positive compare of the 8-bit portion of the memory is flagged to the CPU as invalid data. The CPU can then ignore the data and go through the cycle of retrieving the data from the main memory.

With this architecture, as soon as 32-bit address from the CPU is impressed on the bus, the 7-bit segment of the address indicating the line causes that particular line of data in the 8 pages of the cache to be read out to a multiplexor, this reading starting even before it is known whether there is a comparison between any portion of the 25-bit page address. However, this data is not impressed on the bus until a positive comparison is made in the CAM memory indicating a comparison of the first 8-bit component of the address, in which case the data is assumed to be valid data, even before this is verified by the 25 bit TAG TLB comparison. Thus, the data is impressed on the bus with a minimum of delay. The probability is extremely high that, if the first 8 bits of an address on a given line correspond, then the total translated 25 bits of the address will also correspond, and thus the decision is made to impress the data on the bus. If, however, there is not a comparison, this fact is flagged to the CPU and the data is marked as invalid data before the CPU actually operates on it, and the CPU, through programming, can discard this data and not use it. Thus, the disclosed architecture provides a performance improvement over prior art by generating a late select signal with the CAM comparisons which is available at the time data is read out of the TAG and cache memories.

DESCRIPTION OF THE PREFERRED EMBODIMENT

Figure 1:
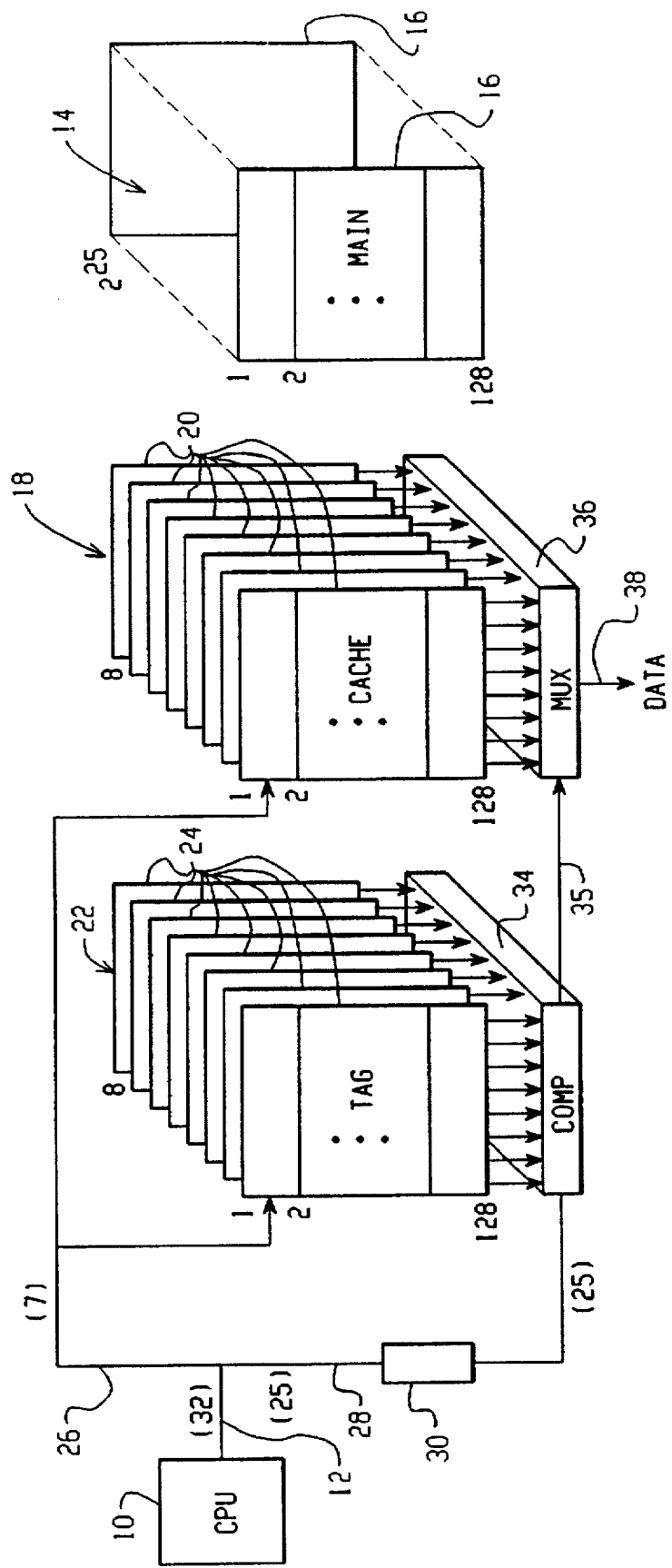
FIG. 1 is a block diagram of one conventional prior art architecture of an addressing scheme for a cache memory utilizing a TAG memory.
Figure 2:
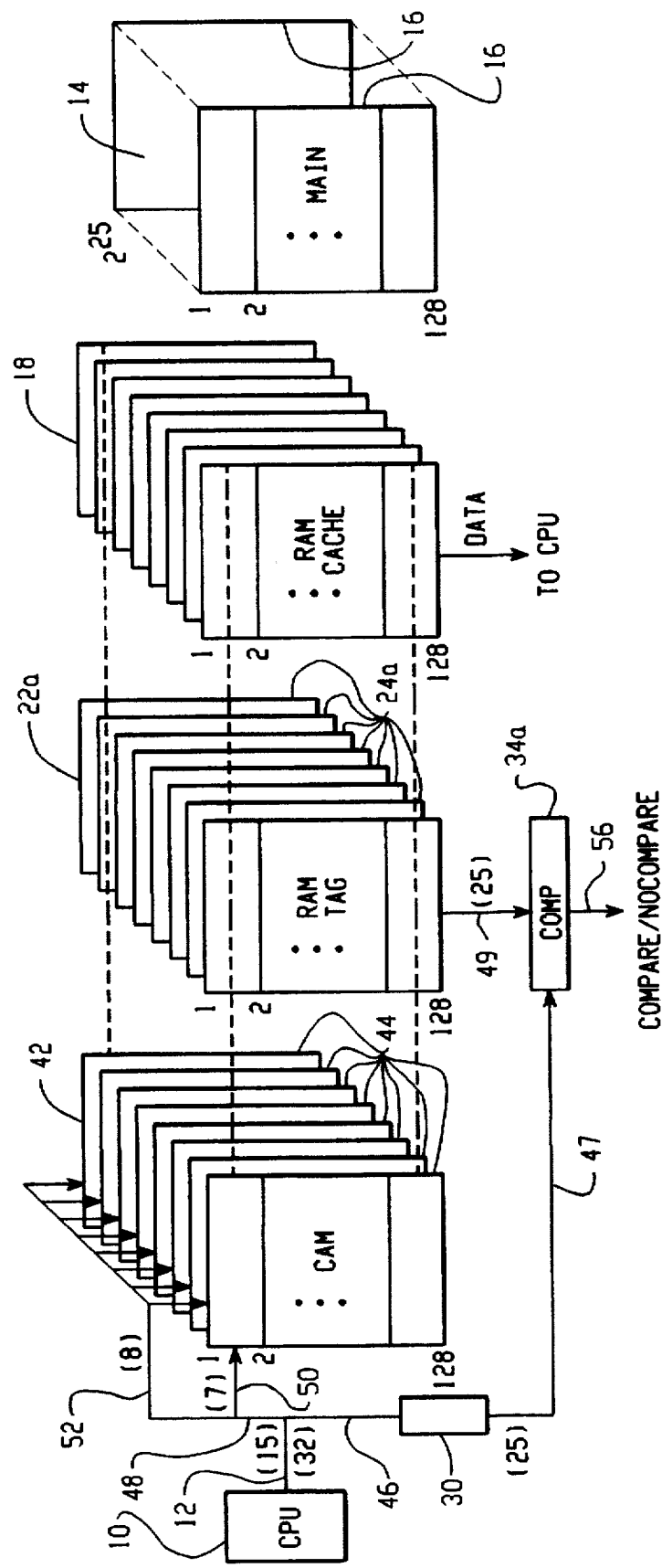
FIG. 2 is a block diagram of another prior art embodiment which is a semi-associative architecture for addressing a cache memory.

Before describing the structure and operation of the present invention as it relates to addressing a cache memory, a description of the prior art techniques will prove beneficial in understanding the present invention. Thus, a depiction of two prior art techniques addressing cache memory are shown in FIGS. 1 and 2. As shown in FIG. 1, a conventional CPU 10 outputs addresses on an address bus 12. In the described embodiment, the address bus is a 32-bit bus, thus allowing 32 bits of address space. Other sizes of bus can be used depending on the number of pages and lines on a page in the main memory storage.

The computer is also provided with a main memory 14 which in one typical embodiment is configured with $2^{25}$ pages, with each page having $2^7$ or 128 lines. Thus, 25 bits are required to address the relevant page, and 7 bits are required to address the relevant line, so that the data contained on any line on any page can be addressed with a 32-bit address, 25 bits representing the page and 7 bits representing the line on the page.

A cache memory 18, which is a Random Access Memory (RAM), is also provided which is comprised of a lesser number of pages, for example, 8 pages, each of which pages is configured with $2^7$ lines, i.e., 128 lines. The cache memory 18 contains data which has been read from the main memory and stored in the cache memory. According to the particular scheme, on whatever line in the main memory data resides, it resides on that same line in one of the 8 pages 20 in the cache memory 18. For example, if a line of data resides on line 50 of page 23 of the main memory, it would reside on line 50 in one of the 8 pages of the cache memory 18. This is a conventional technique of storing data in cache.

A TAG memory 22 (which also is a RAM) having 8 pages 24 is provided which corresponds in arrangement to the arrangement of pages in the cache memory. Each of the lines in the TAG memory contains the 25 bit address of a particular location in the main memory and each of the 8 pages 24 of the TAG memory contains a different address location on the particular line thereof corresponding to the particular line on one of the pages in the main memory. In order to determine if a particular line of data from the main memory is stored in a cache memory and to read that data out, the 32-bit address bus is divided into a 7-bit address bus 26 and a 25-bit address bus 28. The 25-bit address bus 28 goes through a translator 30. The translator 30 translates the virtual address used by the CPU to the real address of the stored data in memory in a well-known way. The translator is typically called a Translation Lookaside Buffer (TLB).

The 7-bit address bus is connected to the TAG memory 22 and also to the cache memory 18 and provides or asserts the 7-bit line address to both the TAG memory 22 and the cache memory 18. The translated 25-bit portion of the address which corresponds to the page being addressed is asserted to comparator 34. The address bus with the 7-bit address asserted thereon causes the TAG memory 22 to read out the 25-bit address locations from each of the 8 pages at the asserted line to the comparator 34, where the comparator compares the 25-bit address asserted on the 25-bit address bus 28 with the 25 bits from each of the line asserted by the 7-bit address on page 24 of the TAG memory 22 and indicates a compare or no compare as output 35 to multiplexor 36. As indicated above, the 7-bit address on address bus 26 is also asserted on the cache memory 18 which causes the particular line corresponding that address to be asserted from that line number in each of the 8 pages 20 of the cache memory 18 on multiplexor 36. If a valid comparison has been determined by the comparator 34 and asserted to the multiplexor 36, the data will be outputted from the multiplexor 36 from the proper line of one of the proper pages 20 selected by the comparator 34 from the TAG memory 22, and which line and page in the cache memory 18 corresponds to the line and page in the TAG memory 22.

In this case, the entire address translation and comparison is made before the data is put out on the data line 38 and thus requires a significant amount of time.

FIG. 2 shows an improved configuration of reading out the data from the cache memory that does speed up the access time somewhat. In this configuration, the CPU 10 again outputs a 32-bit address on a 32-bit address bus 12, and again there is a main memory 14 which is arranged in $2^{25}$ pages 16, each page having $2^7$ bits, i.e., 128 lines. Again, the cache memory 18 is arranged in the same manner. Also, a TAG memory 22a is provided which is again arranged in a configuration having 8 pages 24a of 128 lines each. Again the TAG memory has 25 bits per line to identify the page number of data in main memory. 8 bits of the 25-bit virtual page address are contained in a CAM memory 42, which is arranged in 8 pages 44, with each page being arranged with 128 lines in a similar manner to that of the TAG memory 22a.

The CAM memory does not read out the address segments, but stores them for comparison with memory bits asserted thereto in a well-known manner. To this end, the 32-bit CPU bus 12 has a 25 bit address bus 46 which goes to translator 30 and a 15-bit address bus 48. The 15-bit address bus 48 is comprised of a 7-bit address bus 50 and an 8-bit address bus 52. The CAM memory stores the first 8 bits of the 25-bit virtual page address of data on the corresponding line and page of the CAM memory. When the CPU asserts a 32-bit address on the line, it is divided to the 25-bit address bus 46, which is delivered to translator 30, and 15-bit address bus 48 which is divided into the 7-bit address bus 50 and 8-bit address bus 52. The 7-bit address bus 50 addresses the particular line in the 8 pages, and the 8-bit address bus addresses the CAM memory 42 to determine if that 8-bit segment of the address is stored on any of the 8 pages at that line location in the CAM memory. If a comparison is made in the CAM memory 42 on the line asserted on one of the 8 pages of the CAM, that line on the page is asserted on the TAG memory 22a and the TAG memory on that page is read into the comparator 34a. The comparator 34a compares the 25 bits from that line and page on bus 49 with the 25 bits on the translated address bus 47 and puts a compare/no compare signal on line 56. At the same time, if a match has been made for any of the 8-bit portions of the addresses in any one of the 8 pages in the CAM memory 42, data is read from that corresponding line and page in the cache memory 18. If the first 8 bits of an address compare there is a strong probability that the data is in the cache. The data is asserted onto the line and delivered to the CPU. If indeed there was a compare found in the TAG memory 22a, the compare signal from the comparator 34a delivers such signal to the CPU indicating that it is valid or good data. However, if in the relatively rare circumstance that a compare is not made, the non-compare signal notifies the CPU that the data is not valid data, and the CPU then ignores the data in a manner well known in the art.

In this scheme, while the delivery of the data is sped up somewhat over that of FIG. 1, nevertheless, the data is not accessed from the cache memory 18 until a comparison of the first 8 bits in the CAM memory has been made, which does result in some delay in the reading of the data from the cache memory.

Figure 3:
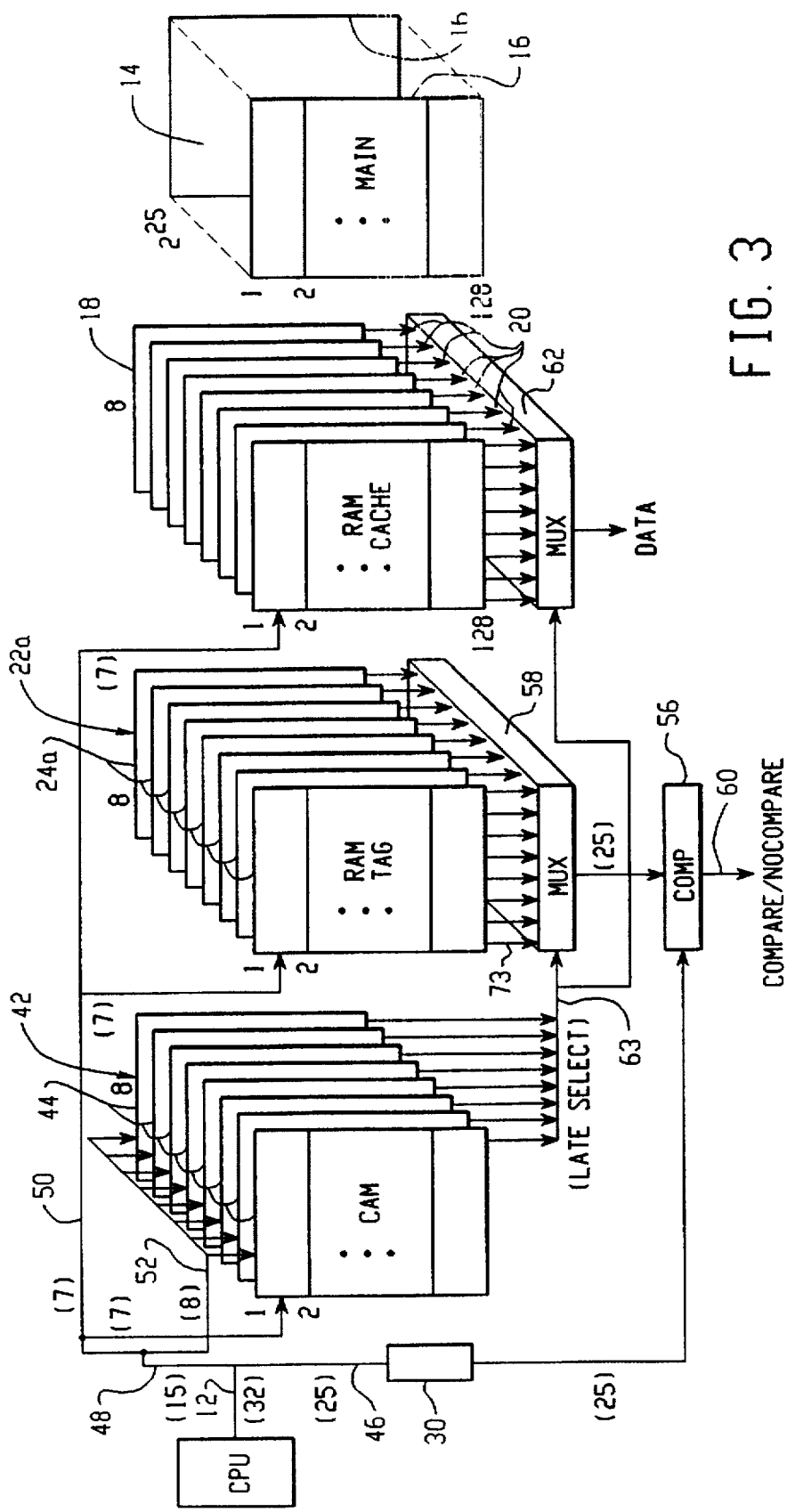
FIG. 3 is a block diagram of the architecture of a computer for addressing cache memory according to the present invention.

The configuration or architecture of the present invention overcomes the limitation of the prior art and allows very quick reading of the data upon the assertion of the address on the address bus as depicted in FIG. 3.

In FIG. 3, the configuration of the main memory 14, cache memory 18, TAG memory 22a and the CAM memory 42 is the same as previously described with respect to FIG. 2. Also, the 32-bit address bus 12 is divided into a 25-bit address bus 46 and a 15-bit address bus 48, which 15-bit address bus 48 is divided into a 7-bit address bus 50 and an 8-bit address bus 52. The 8-bit addresses in bus 52 are also included in bus 46, just as with respect to FIG. 2. However, the handling of the addressing and reading out of the cache memory is different from that of FIG. 2, which allows a faster read of the data from the cache memory 18.

In this case, the 25-bit address bus 46 asserts the address bits on a comparator 56 through translator 30. The 7 bits from the 7-bit address bus 50 are asserted on the CAM memory 42 on the TAG memory 22a and also on the cache memory 18 at the time they are asserted on the bus from the CPU. The 8 bits on the 8-bit address bus 52 are also asserted on the CAM memory 42. When the 8 bits are asserted on the CAM memory 42, a comparison is made to determine if those 8 bits are found on the line selected by the 7 bits on bus 50 on any of the 8 pages 44 of the CAM memory 42, and a compare/no compare signal is asserted on multiplexor 58. The 7 bits on the 7-bit address bus 50 are also asserted on the TAG memory 22a which supplies to comparator 56 the 25-bit addresses for the indicated line number on each of the 8 pages 24a of the TAG memory 22a. Also and at the same time, the 7 bits on the 7-bit address bus 50 are asserted on the cache memory 18, which causes that particular designated line number to be read as data from the line of that number on each of the 8 pages of the cache 18 into multiplexor 62. Thus, as soon as the address of data to be read is asserted on the address bus 50, data is started to be read from the cache 18.

Returning now to the operation of the CAM memory 42 and the TAG memory 22a, as indicated, if a comparison of the 8 bits on the 8-bit bus 52 is found at the selected line of any one of the 8 pages 44 of the CAM memory 42, a late select signal on bus 63 corresponding to the page on which the match occurred is generated and supplied to the multiplexor 58. Also, the 25 bit address at the selected line number for each of the corresponding 8 pages 24a of the TAG memory 22a are read to MUX 58, the output of the MUX 58 which is comprised of the 25 bits selected by the CAM is supplied to comparator 56. A comparison is made with the translated 25 bits from the translator 30 which generates a compare/no compare signal 60 which is delivered to the CPU. In addition to being delivered to the multiplexor 58, the late select signal is also delivered to multiplexor 62. Thus, if a late select signal is generated from the CAM memory 42 indicating that there is a match on 8 bits of memory on the selected line in the 8 pages 44 of the CAM memory 42, this late select signal will allow the multiplexor 62 to deliver the data from that corresponding line and corresponding page 20 in the cache memory, the data being delivered to the CPU. If the translated 25 bits also indicate a compare in the TAG memory 22a, the comparator 56 will generate a compare signal to the CPU indicating that good data has been delivered. However, if there is not a compare in the TAG memory 22a, a "no compare" signal will be delivered from the comparator 56 indicating to the CPU that the data delivered from the cache memory 18 is to be ignored or is not valid data.

To summarize, the operation of the invention as shown in FIG. 3, when an address is asserted on the address bus 50, this address is immediately asserted on the cache memory and that line from each of the 8 pages is read into the multiplexor 62. This line number is also asserted on the CAM and the TAG memories, and if a match of the first 8 bits on bus 52 is found in the CAM memory, a late select signal is sent to the multiplexors 58 and 62 selecting the line from the same page and delivering the 25 bits of the address from the TAG to comparator 56 and the data from the cache to the CPU in anticipation that it is probably good data since there is a match of the first 8 bits of the virtual page address. However, to assure that it is indeed the correct total address, a compare is made of the translated 25 bits of the address asserted on the address bus with the address stored in the TAG memory. If these also compare, then a valid data signal is sent to the CPU. If, however, there is not a compare, a signal is sent to the CPU indicating that the data delivered was invalid data. Thus, with this particular invention, as soon as the address is asserted on the address bus, the line containing that data is read from that corresponding line from each of the 8 pages of the cache memory to a multiplexor, and if a first indication of a compare of 8 bits of the address indicates that there is valid data, that data is delivered to the CPU and, if confirmed by the 25 bits of the TAG memory that it is indeed the proper address of the data, this is confirmed to the CPU. However, if the compare does not confirm this as a proper address or indicate that it is not the address stored, the CPU is instructed to ignore this data. Thus, a much quicker delivery of the data is made to the CPU, the starting of the delivery of the data being immediately upon the assertion of the address on the bus line, and it is very quickly ascertained if a probable match with the first 8 bits exists, which allows the data to be delivered to the CPU with a confirmation of the total 25 bits.

Another advantage of the architecture described is the ease of recovery from aliasing problems that occur when virtual address bits are used to index into a cache. Aliasing occurs when two or more different virtual addresses translate to the same physical address. Since, as previously described, virtual address bits are used to select the cache page it is possible for the same data to be stored at the same line position in two or more pages. This situation must be detected and the extra copies of the same data removed to eliminate data inconsistencies. It is also possible that a CAM match can occur on one page but the data requested by the CPU is present on a different page at the same line position.

The architecture disclosed easily detects either of these conditions since in each cycle that the cache is accessed all the page number addresses for the line accessed are read out and compared to the translated page number requested by the CPU. Multiple data copies as well as instances of data being in a different page than the one the CAM match occurs on are detected by these comparisons.

FIG. 4 DESCRIPTION

As described the 25 bits per page stored in the TAG RAM 24a go on bus 73 to the MUX 58. The page selection is accomplished by the late select signal generated by the CAM. The selected 25 bits of data on bus 49 are sent to the comparator 56 and compared against the 25 bits on bus 47 from the TLB 30. The resulting compare/no compare signal is sent to the CPU on bus 60.

In addition the 25 bits on bus 73 from the TAG RAM 22a also go to the 8 comparators 70a–70h, one per page. The translated address on bus 47 is also sent to latch 71. It is delayed by latch 71 and sent to comparators 70a–70h on bus 74. Comparators 70 a–70 h compare the 25 bits from each page to the delayed translated address. The output of each of the 8 comparators 70a–70h are sent to the CPU on bus 76.

To maintain cycle time the compares in comparators 70a–70h are accomplished in the beginning of the next cycle.

Figure 5:
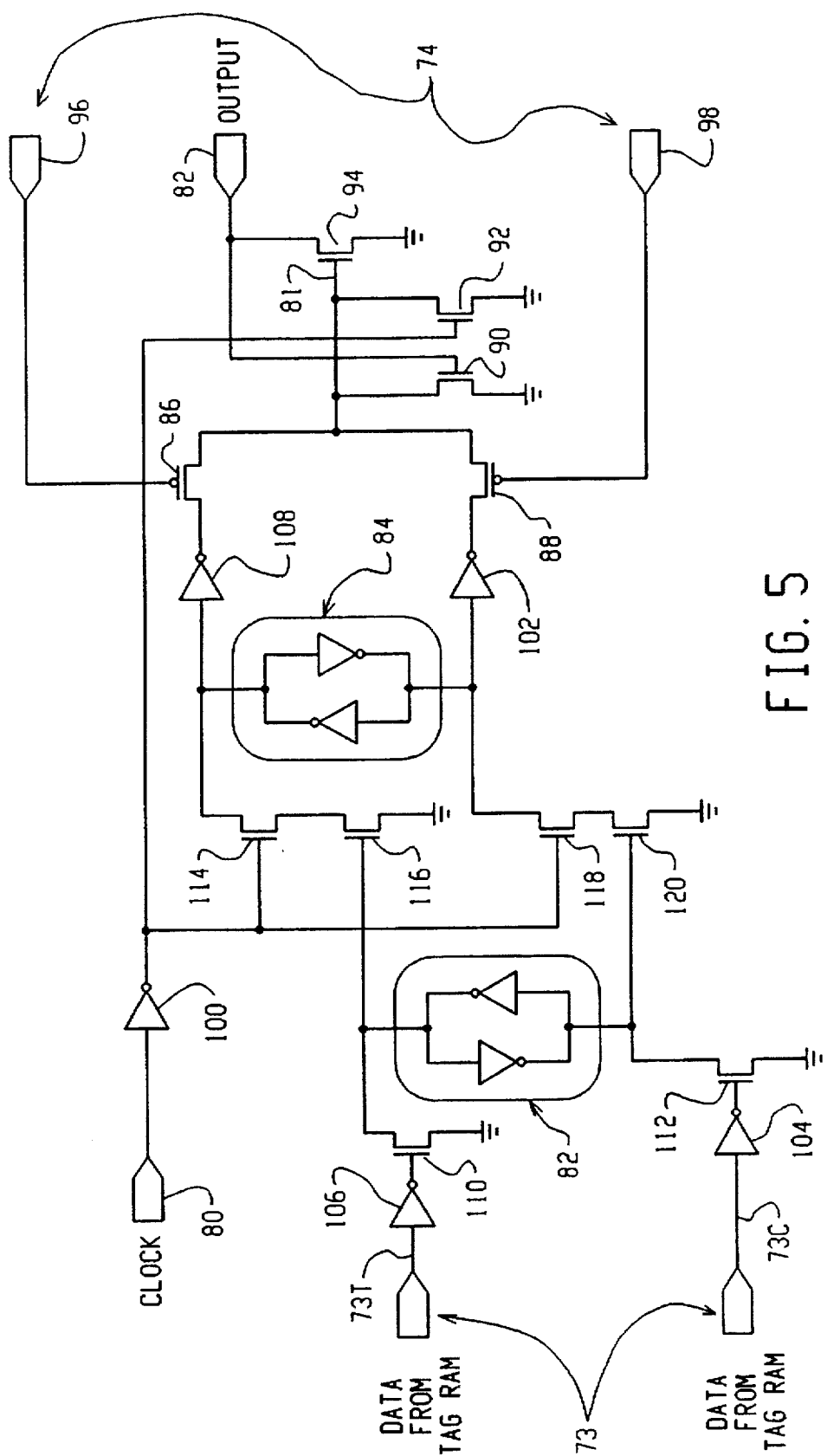
FIG. 5 is a circuit schematic diagram describing a pipeline XNOR circuit used for aliasing.

The resulting 8 hit/miss outputs on bus 76 from comparators 70a–70h also arrive at the CPU in the next cycle. To accomplish this latch 71 delays the translated address on bus 47. Comparator 70a–70h are also required to delay data on bus 74 to the next cycle. This is accomplished by a pipeline technique shown in FIG. 5.

FIG. 5 DESCRIPTION

Figure 4:
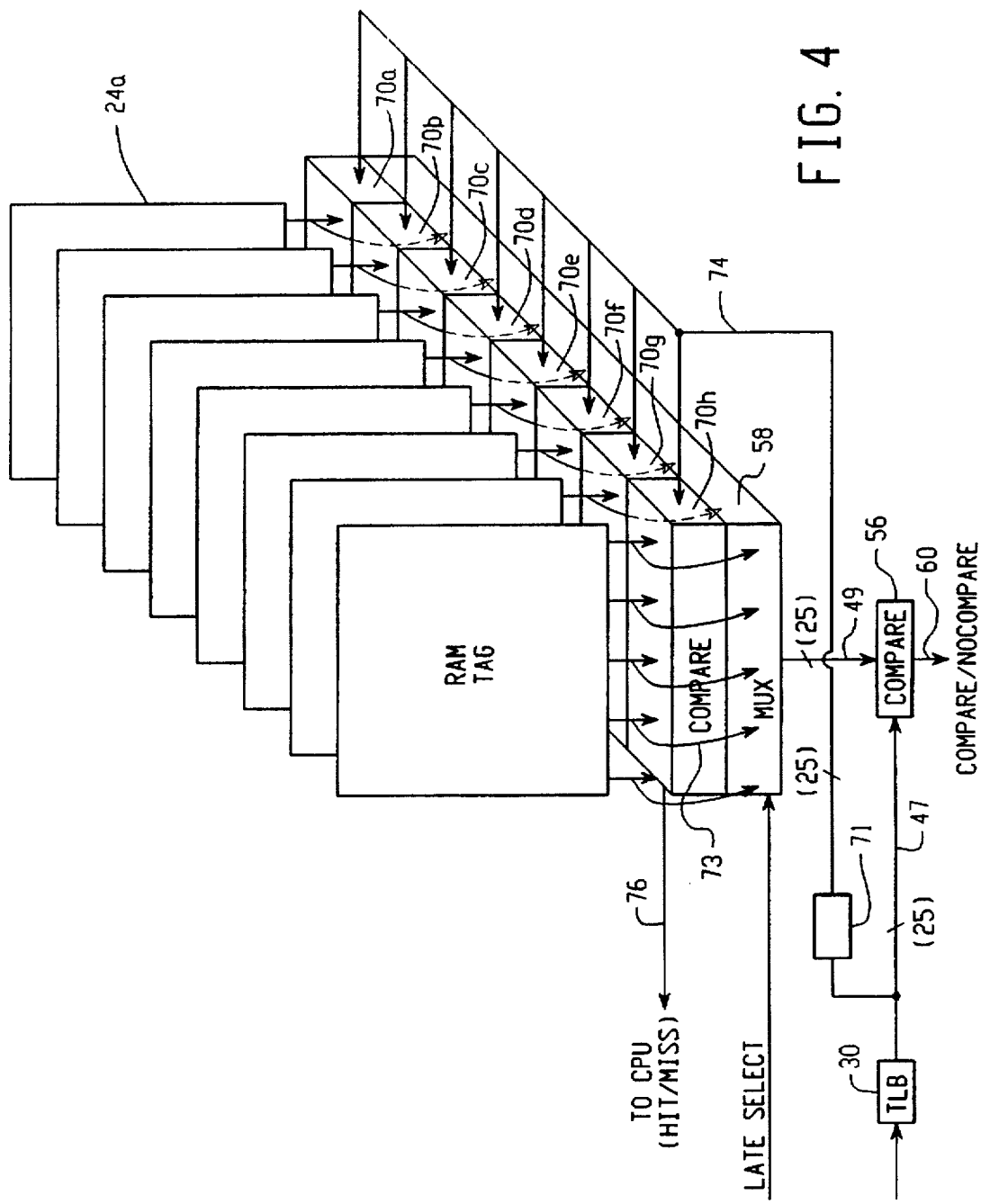
FIG. 4 is a block diagram of the architecture to accommodate detection of aliasing.

One bit of cycle N's TAG RAM data appears differentially on bus 73. Latch 82 is loaded by driving bus 73T (true) or 73C (compliment) low. At the end of cycle N, clock 80 is driven low transferring the contents of latch 82 to latch 84. At the beginning of cycle N+1 one bit of cycle's N differential translated data on bus 74, from latch 71 (FIG. 4) appears on transistors 86 and 88 and is compared against cycle N's TAG RAM data now stored in latch 84. This is accomplished by the PFET exclusive XNOR gate comprised of transistors 86, 88, 90, 92 and 94. At the beginning of each cycle output on node 82 is precharged high and node 81 is held low by device 90. Output on node 96 is driven low only when the bit on bus 74 does not match the bit originally on bus 73. For example, output 96 will be driven LOW when, for example, bit 25 of the translated address does not match bit 25 of the TAG RAM data. 25 of these circuits are included in each comparator 70a–70h one circuit per bit. The output on node 82 of each of the 25 exclusive XNOR are cascade OR'd and strobed to complete the 25 bit compare. (Standard technique). Invertors 100, 102, 104, 106 and 108 are for buffing or driving the circuit. Transistor 110 sets the latch 82 in one direction, and transistor 112 sets latch 82 in the opposite direction. Similarly, transistors 114 and 116 set latch 84 in one direction and transistors 118 and 120 set latch 84 in the opposite direction.

What is claimed is:

1. A method of reading and confirming data stored in a cache RAM memory, which cache RAM memory is organized by page and line, and wherein said data also resides in a multiple page main memory which is organized by page and line, and wherein there are more pages in main memory than in cache memory, and wherein each page in cache memory has the same number of lines as the number of lines on each page in main memory, and wherein the data is addressable in main memory by an address comprised of n number of bits having a q component designating the line of the address and components m and p, which together designate the page of main memory on which the data is stored, and wherein the cache RAM stores each line of data therein on the same line it is stored on in main memory, and wherein said cache memory is addressed by an address signal comprised of said q component of the address, said method comprising the steps of, storing the m component of said address in a first address memory and storing at least the p component of said address in a second address memory, and wherein each of the address memories is organized by address to correspond to the organization of the data in the cache memory, asserting an address signal on an address bus having address components of q, m and p bits to identify the line and page number in main memory of the data to be read;

reading the lines of data corresponding to the q component of the address from each page of the cache memory and reading at least the p component of the address from each line corresponding to the q component of the address for each page of the second address memory, and at the same time as said data and p components of the memories are being read to the multiplexors comparing the m component of the asserted address to the m component stored in each page of said first address memory at said lines corresponding to the q component thereof, and if a compare is found generating a compare signal, If a compare signal is generated, gating said data corresponding to the selected page from said first multiplexor to the CPU and gating at least said p component corresponding to the selected page, comparing at least the p component of the address at the second comparator with the p component in the asserted address and generating and sending to the CPU a compare/no compare signal.

2. The method of claim 1 wherein there are a plurality of pages of cache memory, and a corresponding number of pages of each of said first and second address memories.

3. The method of claim 2 wherein said addresses stored in said second memory are real addresses, and wherein the address asserted on the address bus is a virtual address, and wherein said virtual address is translated to a real address before being asserted at said second memory for comparison.

4. The method as defined in claim 3 wherein the m component said second of the address is stored as a virtual address in said first address memory, and both the m and p components of the address are stored in said second memory as real address and are compared with the m and p components of the real address.

5. The method as defined in claim 4 further defined by comparing any multiple addresses read from said second memory to determine and identify any duplicate addresses.

6. The method as defined in claim 5 wherein the duplicate addresses are identified on the cycle subsequent to the cycle on which they are read.

7. The method of claim 6 wherein the addresses read from the second memory are stored in a first latch on the read cycle on which they are read, and transferred to a second latch for comparison on the cycle next following the cycle on which they are read.

8. The method of claim 4 further characterized by generating a found address signal if the m and p components of an address stored in the second address memory match the m and p component of the translated real address, and the p component of the asserted virtual address does not match a p component stored in the first memory.

9. A computer systems comprising a multiple page main memory and a cache RAM memory in which the cache RAM memory data is organized by page and line, and wherein data in said main memory is also organized by page and line, and wherein there are more pages in main memory than in cache memory, and wherein each page in cache memory has the same number of lines as the number of lines on each page in main memory, and wherein the data is addressable in main memory by an address comprised of n number of bits having a q component designating the line of the address and components m and p, which together designate the page of main memory on which the data is stored, and wherein the cache RAM stores each line of data therein on the same line it is stored on in main memory, and wherein said cache memory is addressed by an address signal comprised of said q component of the address, a first address memory for storing the m component of said address, and a second address memory for storing at least the p component of said address, and wherein each of the address memories is organized by address to correspond to the organization of the data in the cache memory, an address bus for asserting an address signal having address components of q, m and p to identify the line and page number in main memory of the data to be read;

logic circuitry to read the lines of data corresponding to the q component of the address from each page of the cache memory and at least the p component of the address from the lines corresponding to the q component of the address for each page of the second address memory and logic circuitry, including a first comparator, to compare the m component of the asserted address to the m component stored on each page in said first address memory at said lines corresponding to the q component thereof at the same time as said data and p components of the cache memory and second memory are being read and if a compare is found between the m components to generate a first compare signal, a logic gate for gating said data corresponding to the selected page of said cache memories to the CPU and gating at least said p component corresponding to the selected page to a second comparator, said second comparator including logic to compare at least the p component of the address at the second comparator with the p component in the asserted address and generate to the CPU a compare/no compare signal.

10. The system as defined in claim 9 wherein there are a plurality of pages of cache memory, and a corresponding number of pages of each of said first and second address memories.

11. The system of claim 10 wherein said addresses stored in at least said second address memory are real addresses, and wherein the address asserted on the address bus is a virtual address, and a translator to translate at least the portion of the address stored in the second address memory to a real address before comparison.

12. The system as defined in claim 11 wherein the m component of the address is stored as a virtual address in said first address memory, and both the m and p components of the address are stored in said second memory as real address and are compared with the m and p components of the real address.

13. The system as defined in claim 12 further comprising aliasing logic circuitry to compare any multiple addresses read from said second memory to determine and identify any duplicate addresses.

14. The system as defined in claim 13 wherein said aliasing logic circuitry includes logic to identify duplicate addresses on the cycle subsequent to the cycle on which they are read.

15. The system of claim 14 wherein the aliasing logic circuitry includes a first latch to store the address read from the second memory on the read cycle on which they are read, and a second latch for storing said address from the first latch on the cycle next following the cycle on which they are read.

16. The system as defined in claim 10 wherein said first address memory is a CAM.

* * * * *